(12) United States Patent
McCormick et al.

(10) Patent No.: US 10,129,043 B2
(45) Date of Patent: Nov. 13, 2018

(54) APPARATUS AND METHOD FOR NETWORK FLOW SCHEDULING

(71) Applicant: Huawei Technologies Canada Co., Ltd., Kanata (CA)

(72) Inventors: William Carson McCormick, Ottawa (CA); Peter Ashwood-Smith, Gatineau (CA); Francis Patrick Kelly, Cambridge (GB)

(73) Assignee: Huawei Technologies Canada Co., Ltd., Kanata, Ontario (CA)

( * ) Notice: Subject to any disclaimer, the term of this patent is extended or adjusted under 35 U.S.C. 154(b) by 158 days.

(21) Appl. No.: 15/187,415

(22) Filed: Jun. 20, 2016

(65) Prior Publication Data

US 2017/0126416 A1    May 4, 2017

Related U.S. Application Data (60) Provisional application No. 62/250,820, filed on Nov. 4, 2015.

(51) Int. Cl.
| | | |
|---|---|---|
| *H04L 12/18* | (2006.01) | |
| *H04L 12/723* | (2013.01) | |
| *H04L 12/753* | (2013.01) | |

(52) U.S. Cl.
CPC .......... *H04L 12/189* (2013.01); *H04L 45/48* (2013.01); *H04L 45/50* (2013.01)

(58) Field of Classification Search
CPC ....... H04L 41/04; H04L 41/085; H04L 41/12; H04L 45/02; H04L 41/0853; H04L 43/12; H04L 45/04; H04L 12/18; H04L 12/184; H04L 12/1845; H04L 12/185; H04L 2012/5642; H04L 2012/6416; H04W 84/18; H04J 2203/0019
USPC ....... 370/235, 236, 240, 254, 255, 390, 312, 370/400, 401
See application file for complete search history.

(56) References Cited

U.S. PATENT DOCUMENTS

| | | |
|---|---|---|
| 6,456,597 B1 | 9/2002 | Bare |
| 2008/0198865 A1 | 8/2008 | Rudnick et al. |
| 2010/0208733 A1* | 8/2010 | Zhao ...................... H04L 12/185 370/390 |

(Continued)

OTHER PUBLICATIONS

Optimal Layered Multicast with Network Coding: Mathematical Model and Empirical Studies by Li et al. 2006.*

(Continued)

*Primary Examiner* — Dady Chery
(74) *Attorney, Agent, or Firm* — Slater Matsil, LLP (57) ABSTRACT

Embodiments are provided for path flow scheduling of multicast traffic through a network. The paths for traffic flow are determined to optimize link utilization in terms of bandwidth and link capacity, and limit link cost. In an embodiment, a method is implemented for network flow scheduling. The method includes establishing, by a controller of a network, a multicast tree which includes a plurality of links for sending multicast traffic from a source to multiple destinations. The tree is established based on minimizing a number of links in the multicast tree. The tree is then adjusted by replacing one or more of the plurality of links to reduce the link utilization. The tree adjustment is repeated by further replacing one or more links in the multicast tree to further reduce the link utilization.

20 Claims, 4 Drawing Sheets

SUB-OPTIMAL TREE #1
DEPTH = 3
1 HOT LINK (56) References Cited

U.S. PATENT DOCUMENTS

| | | |
|---|---|---|
| 2011/0211517 A1 | 9/2011 | Moscibroda et al. |
| 2011/0273990 A1 | 11/2011 | Rajagopalan et al. |
| 2013/0191829 A1 | 7/2013 | Shimokawa et al. |
| 2014/0133302 A1 | 5/2014 | Fu et al. |
| 2014/0147120 A1 | 5/2014 | Patel et al. |
| 2015/0062285 A1 | 3/2015 | Xu et al. |
| 2015/0244647 A1 | 8/2015 | Gopalan et al. |

OTHER PUBLICATIONS

Adaptive Scheduling in Ad Hoc and Cellular wireless networks by Tan, Choo Chin Jan. 2013.*

* cited by examiner

APPARATUS AND METHOD FOR NETWORK FLOW SCHEDULING

This application claims the benefit of U.S. Provisional Application No. 62/250,820 filed on Nov. 4, 2015 by William Carson McCormick et al. and entitled "System and Method for Network Flow Scheduling," which is hereby incorporated herein by reference as if reproduced in its entirety.

TECHNICAL FIELD

The present invention relates to networking and telecommunications, and, in particular embodiments, to an apparatus and method for network flow scheduling.

BACKGROUND

Generally, wired and wireless internet communications are provided by connections via one or more links between network nodes. These connections can be wired or wireless, and can include both access network and backhaul connections. The nodes connected can include wireless access points such as base stations, user equipment, routers, optical devices and other core network nodes. The links are used to provide an end-to-end communications connection. A mechanism such as multiprotocol label switching (MPLS) may be used to direct data from one network node to the next based on short path labels that identify virtual paths between nodes, rather than the endpoints. Shortest path flow scheduling, however, tends to congest the shortest path links. Therefore it may reduce network throughput for best effort traffic, and it may create congested network spots that require operator attention. It also may block new flow establishment. An efficient network flow scheduling scheme, which could avoid or limit such unwanted situations and could improve network link utilization, is thus needed.

SUMMARY OF THE INVENTION

In accordance with an embodiment, a method for network flow scheduling is provided. The method includes establishing a multicast tree that includes a plurality of links for sending multicast traffic from a source to multiple destinations based on minimizing a number of links in the multicast tree. The multicast tree has a link utilization and a tree cost for the plurality of links. The method further includes evaluating the tree cost of the multicast tree in accordance with an acceptable tree cost requirement, and adjusting the multicast tree by replacing one or more of the plurality of links in accordance with a link utilization objective. The method further includes re-evaluating the tree cost of the adjusted multicast tree, and re-adjusting the evaluated multicast tree until the acceptable tree cost requirement is satisfied. An apparatus for performing this method is also provided.

In accordance with another embodiment, another method for network flow scheduling is provided. The method includes establishing a multicast tree that includes a plurality of links for sending multicast traffic from a source to multiple destinations based on minimizing a tree depth of the multicast tree and according to a link capacity constraint, and replacing one or more of the links to reduce link utilization on the multicast tree until reaching or exceeding a maximum tree depth allowed for the multicast tree. The link utilization represents a total bandwidth used for sending the multicast traffic on the links to a total capacity of the links. An apparatus for performing this method is also provided.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Various Internet based applications require flow and path scheduling throughout a network infrastructure. For example, in a network supporting Internet Protocol Television (IPTV) for digital terrestrial television (DTTV), ad hoc services and on demand multicast, and best effort services, information is delivered to transmit stations or to homes in the form of packets through a network. Typically, the packet traffic is sent from a source, e.g., a server where the programming data is stored, to multiple end or destination points. Due to the nature of the networks in question, different flows may be placed on different paths. The multiple end points may correspond to end users (e.g., at homes or businesses) or may correspond to wireless transmit stations.

System and method embodiments are provided herein for path flow scheduling of multicast traffic through a network. The paths for traffic flow are determined to optimize link utilization in terms of bandwidth and link capacity, and limit link cost. This scheme provides improved link utilization compared to other schemes for multicast traffic flow scheduling, such as shortest path flow scheduling, which are based primarily on link cost, e.g., the total number of links or the depth of the multicast tree. In an embodiment, the multicast tree paths allocated for traffic flow are determined by minimizing a function of link utilization and tree depth. The link utilization can be measured as a ratio of the bandwidth needed for the traffic to the available link capacity, as described further below. This scheme can be used to rout IPTV packets for DTTV, ad hoc traffic for video applications, or best effort traffic, more efficiently to avoid congestion spots or bottleneck links, to avoid reserved or selected links, or both.

Figure 1A:
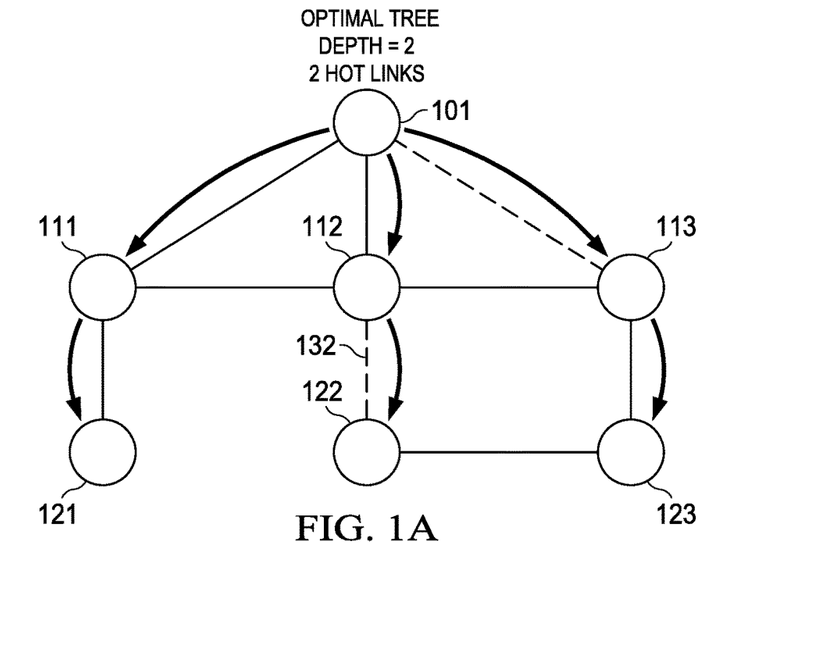
FIGS. 1A, 1B, and 1C show an embodiment of implementing network flow scheduling to improve link utilization.
Figure 1B:
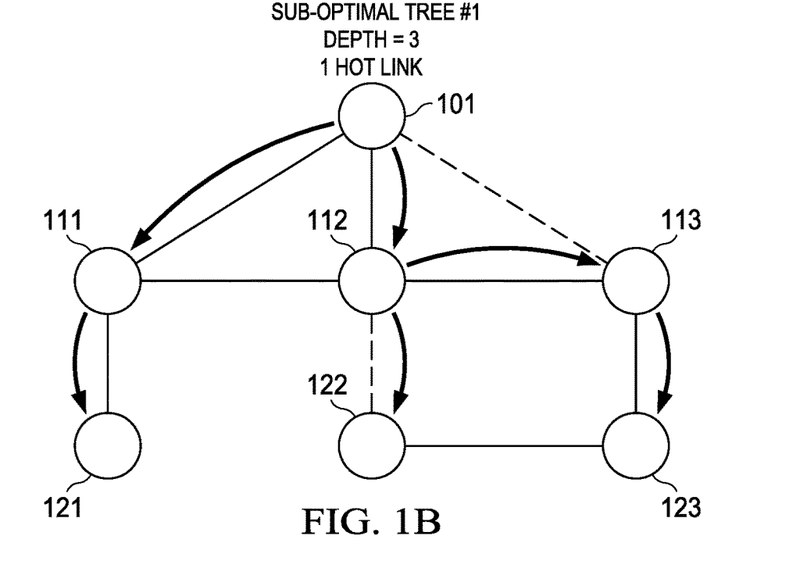
Figure 1C:
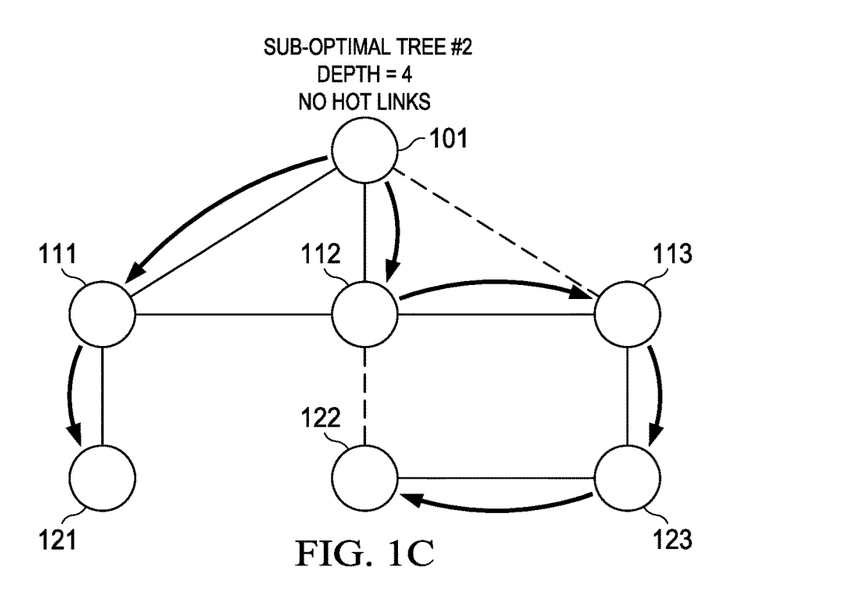

FIGS. 1A, 1B and 1C illustrate steps for network flow scheduling to improve (minimize) link utilization in a network. A multipath tree is built to send traffic form a source point (the tree root) to multiple points (the tree leaf, or terminal, nodes) with the objective of minimizing link utilization while limiting tree depth. The link utilization is defined as the percentage or ratio of bandwidth used for directing the traffic on selected links to the total capacity on the selected links. This is achieved by first building a minimum depth tree, as shown in FIG. 1A. The minimum tree depth in this example is equal to 2 where each one of the tree leaf nodes 121, 122, and 123 is separated from the root 101 by one of the intermediate nodes 111, 112, and 113. The resulting optimal depth tree contains two hot links: a first hot link 131 between root 101 and intermediate node 113; and a second hot link 132 between intermediate node 112 and leaf node 122. A hot link is a link of which bandwidth usage has exceeded a determined threshold of its total capacity. Therefore, the utilization of such links is high.

Next, the utilization of the hot links for traffic flow is minimized at the expense of relaxing the minimum tree depth. As shown in FIG. 1B, traffic is routed around the hot link 131 from root 101 to intermediate node 113 through the links 141 and 142. This increases the tree depth to 3 but avoids overburdening links (which may be described as a reduction in total link utilization). FIG. 1C shows further improved link utilization by rerouting the traffic around hot link 132 from intermediate node 112 to leaf node 122 through the links 141, 142 and 143. Thus, link cost in term of depth is increased to 4.

The scheme above is used to optimize link utilization by compromising minimum link depth. Increasing the link depth of the distribution tree may increase total link length for routing traffic. However, the resulting minimum link utilization tree avoids bottlenecks or hot links which can compensate for delay created with increasing the total link length. The same scheme can also be used to avoid selected links, which are herein referred to as cold links. A cold link is a link that at the time at which the multipath tree is computed carries a volume of data below a threshold. In some networks, a link may be based on leased capacity. If no traffic is transmitted on the link, there may be no fee for usage. In other examples, charging for the leased link may be done based on volume tiers such that the rates charged for traffic are associated with thresholds such that the cost of transmitting a block of data increases as the traffic levels on the link increase. In these examples, in addition to (or in place of) avoiding placing traffic on hot links, it may be beneficial to avoid putting traffic on cold links (or at least avoid putting certain volumes of traffic on cold links). For example, the tree can be used to multicast best effort traffic, avoiding cold links that if used would result in an increase in the cost of operating the network. Thus, the risk of new flow blocking is reduced. In another embodiment, the multicast tree is initially built to minimize a link cost rather than tree depth. For example, each link is assigned a cost value in terms of charge of usage, bandwidth or any other cost target. Subsequently, link utilization is minimized by compromising the minimum link cost. It should be noted that it is also possible to create a multipath tree that takes into account link capacity that has been committed to other traffic flows.

In an embodiment, the algorithm and objective (optimization) function for determining the multicast tree for path flow scheduling can be established using a plurality of variables. The variables can include: f, the bandwidth requested for the multicast; l, the index for each considered link in the network; k, the index for each destination node in the multicast tree; Cl, the capacity of each considered link; cl, the cost of each considered link; xlk, the indicator variable that indicates if a link l is on the path to destination node k; yl, the indicator variable that indicates if a link l is used in the multicast tree; d, the integer variable that tracks the depth of the tree; u, the real variable that tracks the maximum link utilization in the tree; and rl, the indicator variable used to track candidates for second highest link utilization.

The core optimization algorithm can be embodied in a program (or a set of programs) that is built around a set of constraints which force the algorithm solver to construct a multicast tree. These constraints can include flow conservation constraints, link usage constraints and link capacity constraints.

Flow conservation constraints force the optimizer to build a path from the source node to each destination node in the network. Each destination node can have a set of constraints associated with it, including the following. Each egress node must have at least 1 incoming link and 0 outgoing links. Each ingress node must have at least 1 outgoing link and 0 incoming links. This constraint may be redundant with the above constraint. If constraints are determined to be redundant with other constraints, they may not need to be implemented. In some embodiments, nodes other than the ingress and egress nodes have the same number of outgoing and incoming links. Additionally, the number of incoming/outgoing links is either 0 or 1.

Link usage constraints allow the solver to connect all the individual paths into a tree. For every link, the link usage constraint indicates whether the link is part of the multicast tree or not. The constraint can be formulated as follows: $y_l \geq x_{lk}$, $\forall k$, $\forall l$. For this constraint to function properly, the objective function should be trying to minimize L(y) (where L(●) is a linear function and y=[yl]).]

Link capacity constraints can be used to ensure that the solver does not overcommit any links in the network. In this case, these constraints just ensure that each link has enough capacity to support the multicast.

In order to build a minimum depth tree, a variable d is used to track the depth of the tree. The tree depth is based on the path length to any of the destination nodes, so the following constraint is also included:

$$d \geq \sum_l x_{lk}, \forall k.$$

The objective function attempts to minimize d for this constraint to function properly. This can be achieved by weighing the depth parameter more heavily than the total cost of links. In order to build a minimum depth tree, an objective function in the following form can be used: minimize $$vd + \sum_l c_l y_l.$$

In this objective function, the variable d is scaled up in value by a weight parameter, v, to permit minimizing the cost of all the links in the tree $$\left(\sum_l c_l y_l\right)$$

as a secondary objective. The depth parameter should be scaled large enough to emphasize the minimization of d as objective over the total link cost. Different scaling factors can be used for different purposes depending on the application or network scenario. In another embodiment, the tree is built by minimizing individual metrics using a unicast to each egress node, and then combining the resulting unicasts into a multicast tree.

The second optimization objective to solve is to minimize the maximum link utilization of all the links used in the tree, given a maximum allowed tree depth. This is intended to route the tree around congested links when possible. In order to implement this objective, the utilization of the links in the tree is tracked by combining the $y_l$ variables with the bandwidth and link capacity:

$$u \geq y_l \frac{f}{C_l}, \forall l. \quad (1)$$

The objective function to minimize the maximum link utilization can be formulated as follows: minimize $$wu + \sum_l c_l y_l.$$

In the second objective function, the variable u is scaled up in value by a weight parameter, w, to permit minimizing the total link cost in the tree as a secondary objective. The link utilization parameter should be scaled large enough to emphasize the minimization of u as objective over the total link cost. The link utilization in equation (1) is an approximation of the link utilization. The actual link capacity may be C, but the link capacity available to the solver is C'=C−b, where b is some part of the link capacity that has already been committed. The real link utilization would be (f+b)/C. The constraint may then be better represented as:

$$u \geq y_l \frac{f+b}{C}, \forall l.$$

The above describes a method to route traffic around congested links by using an objective function that minimizes the total utilization of all the links used in the tree (subject to given constraints). An alternative method is to construct an objective function that minimizes the second highest link utilization in the following manner. A variable $u_2$ is defined as the second highest link utilization of the links used by the flow. A new set of binary variables $\{r_l\}$—one per link—is defined. The variables in the set are used to count the number of links where $u_2$ is greater than the link utilization. The following constraint is used to establish a value for $r_l$:

$$r_l > u_2 - \frac{f+b}{C}.$$

Because $r_l$ is either 0 or 1, if $$u_2 > r_1 \frac{f+b}{C},$$

$r_l$ will be forced to 1. If $$u_2 \leq r_1 \frac{f+b}{C},$$

then $r_l$ will be forced to 0. If $$u_2 - \frac{f+b}{C}$$

is greater than 1, then solving the problem may become infeasible. To avoid this situation, the problem should be scaled properly to constrain the link utilization to the interval [0, 1].

The final constraint is to constrain the number of non-zero instances of $r_l$:

$$\sum_l r_l = \sum_l y_l - 1.$$

This constraint should force $u_2$ to be equal to the second highest link utilization, provided that the objective function is trying to minimize $u_2$ in some manner. This approach may be extended to compute the third, fourth, and other higher order highest link utilizations if necessary.

The above description maintains the status quo for all of the flows except the next one, which reduces link congestion. An alternative approach is to route all flows, including the next one, using this technique. By leaving existing flows with their status quo assignments, an overall suboptimal distribution pattern may be arrived at, but the operational difficulties associated with rerouting already placed flows are avoided.

In an embodiment, the flow scheduling scheme for minimizing link utilization can be implemented as an algorithm using mixed integer linear programming (MILP). Rescheduling existing flows that are currently causing (or are subject to) congestion on a given link may be performed using techniques such as a multiprotocol label switching (MPLS) hitless reroute. Those skilled in the art will appreciate that Software Defined Networking (SDN) controllers could be used in another embodiment to provide the rerouting, and can further be used in a hitless manner as well.

In further embodiments, the algorithm can be adjusted to predict and avoid links that are expected to be congested in the future based on recurrence patterns (e.g., every Sunday), based on calendared events (e.g., a football schedule where a football game is expected to cause congestion on certain links), or statistics patterns of previous similar events. For instance, machine learning techniques can be used to take a recurrence pattern/calendar as input and generate link congestion data as output. Historical data can be recorded so that it may subsequently be used to estimate link utilization at a specific time. Routing may then be based on anticipation that certain links are going to be congested.

Figure 2:
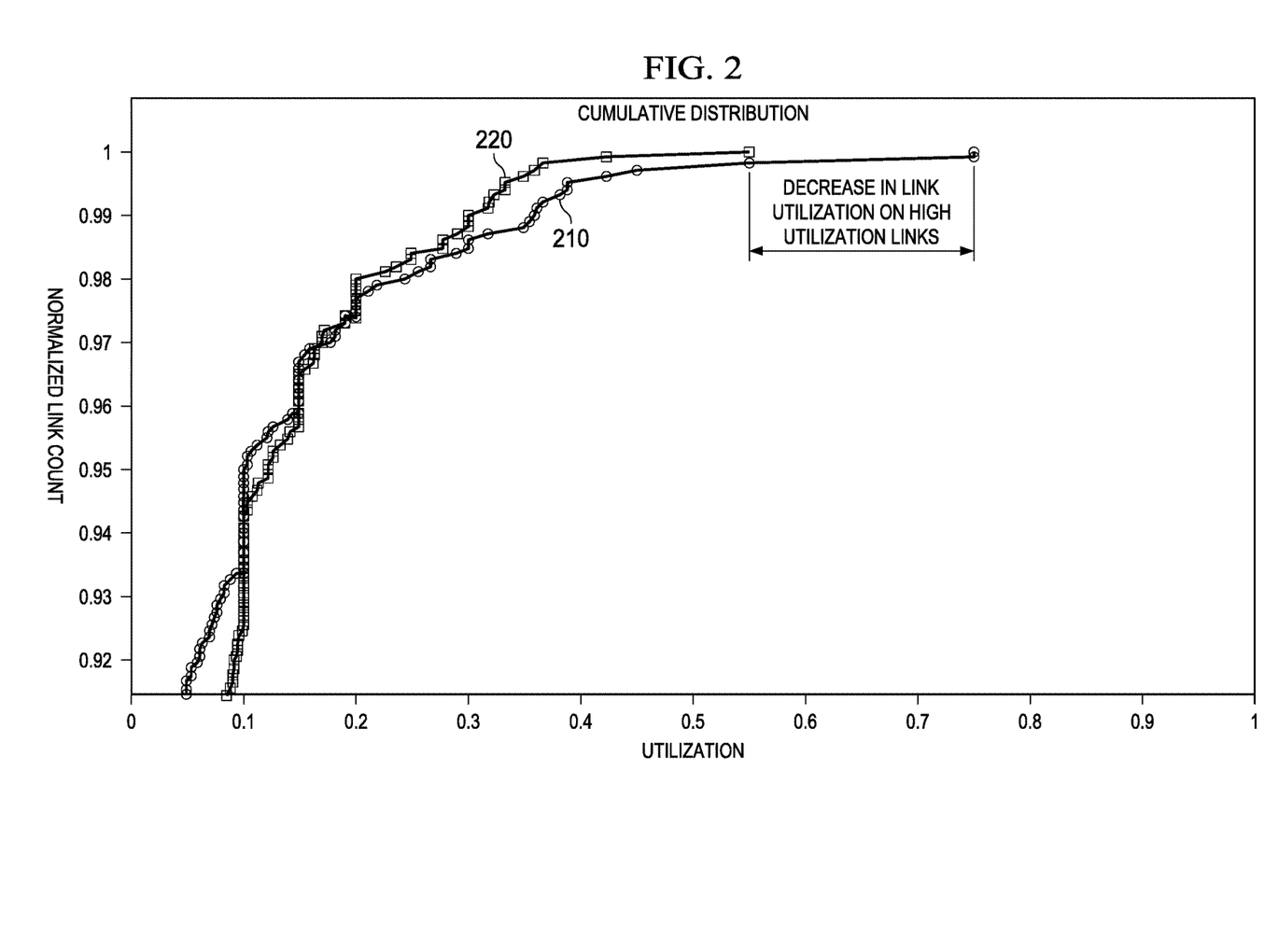
FIG. 2 shows a cumulative distribution function comparison for network flow scheduling.

FIG. 2 shows a graph for a cumulative distribution function comparison for network flow scheduling. The values shown are calculated for a study case of a multicast tree scenario. The resulting data is shown to illustrate a pattern and advantage of the network flow scheduling scheme described above. The vertical axis in the graph represents the normalized link count, while the horizontal axis represents link utilization in the interval [0, 1]. Curve 210 shows the cumulative distribution of data scheduled in a multicast tree based on minimum tree depth. Curve 220 shows the cumulative distribution of the data after rescheduling to minimize link utilization at the expense of tree depth, as described above. The cumulative distribution reflects the percentage of links (normalized link count) at or below a normalized utilization value. As can be seen, curve 220 has lower link utilization on the more congested links, i.e., has a lower link count at high utilization values.

Figure 3:
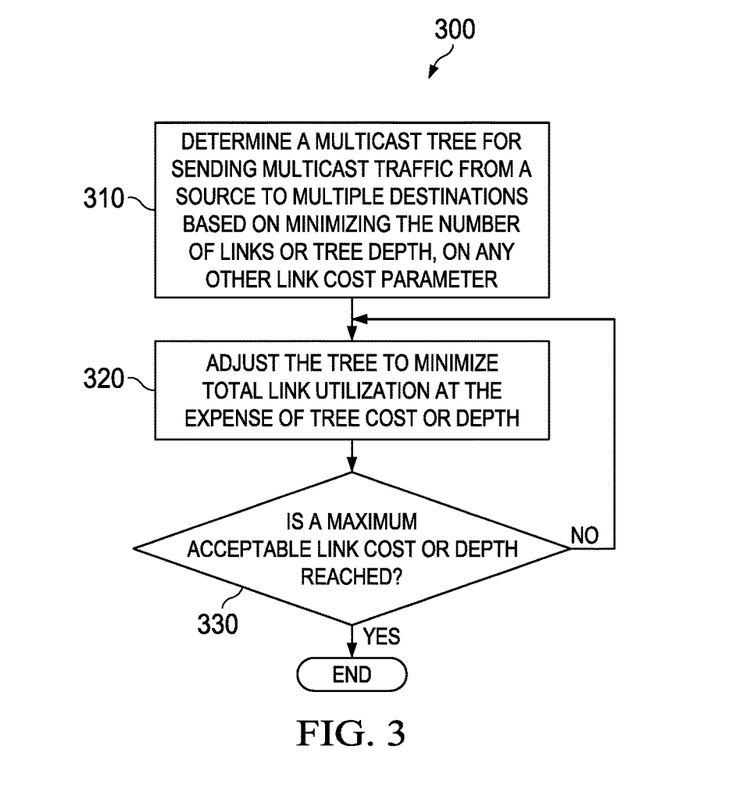
FIG. 3 shows an embodiment method for implementing network flow scheduling to improve link utilization.

FIG. 3 shows an embodiment method 300 for implementing network flow scheduling to improve link utilization. The method 300 may be implemented by a scheduler, controller or network management entity in the form of algorithm steps using MILP or any suitable machine programming technique. As described above, the method 300 can be used for routing multicast traffic of high priority such as traffic for ad hoc events or best effort traffic. The method 300 can also be implemented for any suitable networks including MPLS and SDN networks.

At block 310, a multicast tree is determined for sending multicast traffic from a source to multiple destinations based on minimizing the number of links or tree depth, on any other link cost parameter. The tree determination could be subject to constraints such as the conservation of all considered flows, link capacity, and link utilization. At block 320, the tree is adjusted to minimize total link utilization at the expense of tree cost or depth. The tree cost or depth is relaxed by a determined amount, for instance an integer value of 1, to allow further reduction of the link utilization. This step allows hot links avoidance where link utilization due to congestion is typically high. Similarly, cold links can be avoided by assigning high utilization values to such links. At step 330, the method determines whether a maximum acceptable link cost or depth is reached. If this condition is true, then the method ends and the resulting adjusted tree is used for scheduling the traffic. Otherwise, step 320 is repeated to further reduce total link utilization at the expense of increase in link cost or depth.

Figure 4:
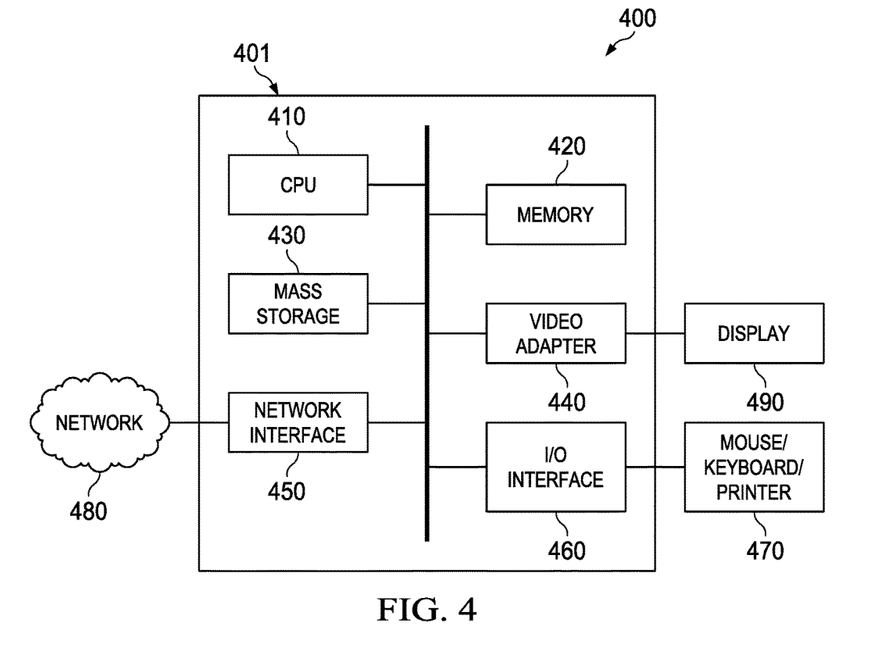
FIG. 4 is a diagram of a processing system that can be used to implement various embodiments.

FIG. 4 is a block diagram of a processing system 400 that can be used to implement various embodiments including the methods above. For instance, the processing system 400 can be part of a solver entity, e.g., a network controller or router, configured to solve the network flow scheduling problem to determine the multicast tree. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a speaker, microphone, mouse, touchscreen, keypad, keyboard, printer, display, and the like. The input/output devices also include a camera for capturing digital picture or video. The processing unit 401 may include a central processing unit (CPU) 410, a memory 420, a mass storage device 430, a video adapter 440, and an I/O interface 460 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 460 provide interfaces to couple external input and output devices to the processing unit. As illustrated, examples of input and output devices include a display or touchscreen 490 coupled to the video adapter 440 and any combination of camera/keyboard/mouse 470 coupled to the I/O interface 460. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for network flow scheduling, the method comprising:
    establishing, by a controller of a network, a multicast tree, including a plurality of links for sending multicast traffic from a source to multiple destinations, based on minimizing a number of links in the multicast tree, the multicast tree having a link utilization and a tree cost for the plurality of links, wherein the tree cost comprises a maximum number of links allowed for the multicast tree, and the maximum number of links is larger than the minimized number of links;
    evaluating the tree cost of the multicast tree in accordance with an acceptable tree cost requirement;
    adjusting the multicast tree by replacing one or more of the plurality of links in accordance with a link utilization objective; and
    re-evaluating the tree cost of the adjusted multicast tree, and re-adjusting the evaluated multicast tree until the acceptable tree cost requirement is satisfied.

2. The method of claim 1, wherein step of adjusting the multicast tree includes replacing a link in the plurality of links to reduce the link utilization.

3. The method of claim 1, wherein the step of adjusting the multicast tree includes replacing a link in the plurality of links to avoid placing traffic on a hot link.

4. The method of claim 1 wherein the step of adjusting the multicast tree includes replacing a link in the plurality of links to avoid placing traffic on a cold link.

5. The method of claim 1, wherein the tree cost is a measure of tree depth or a number of links in the multicast tree.

6. The method of claim 1, wherein the link utilization is a ratio of bandwidth for sending the multicast traffic on the links to a total capacity for routing traffic on the links.

7. The method of claim 1, wherein the multicast tree is established and adjusted using mixed integer linear programming (MILP).

8. The method of claim 1, wherein establishing the multicast tree includes:
    building a plurality of unicast paths from the source to the multiple destinations in accordance with minimizing the number of links in the multicast tree; and
    combining the unicast paths into a multipath tree.

9. The method of claim 1, wherein adjusting the multicast tree increases the tree cost of the multicast tree.

10. A method for network flow scheduling, the method comprising:
    establishing, by a controller of a network, a multicast tree including a plurality of links for sending multicast traffic from a source to multiple destinations based on minimizing a tree depth of the multicast tree and according to a link capacity constraint; and
    replacing one or more of the links to reduce link utilization on the multicast tree, until reaching or exceeding a maximum tree depth allowed for the multicast tree, the link utilization representing a total bandwidth used for sending the multicast traffic on the links to a total capacity of the links, wherein the maximum tree depth allowed for the multicast tree is larger than the minimized tree depth.

11. The method of claim 10, wherein the link capacity constraint ensures that each link in the multicast tree has enough capacity to support the multicast traffic.

12. The method of claim 10, wherein the network is a multiprotocol label switching (MPLS) network.

13. The method of claim 10, wherein the network is a Software Defined Networking (SDN) network.

14. The method of claim 10, wherein the multicast traffic includes Internet Protocol Television (IPTV) packets for digital terrestrial television (DTTV), ad hoc traffic for video applications, or best effort traffic.

15. A network entity for scheduling traffic flow, the network entity comprising:
    at least one processor coupled to a memory; and
    a non-transitory computer readable storage medium storing programming for execution by the at least one processor, the programming including instructions to:
    establish a multicast tree, including a plurality of links for sending multicast traffic from a source to multiple destinations, based on minimizing a number of links in the multicast tree, the multicast tree having a link utilization and a tree cost for the plurality of links, wherein the tree cost comprises a maximum number of links allowed for the multicast tree, and the maximum number of links is larger than the minimized number of links;
    evaluate the tree cost of the multicast tree in accordance with an acceptable tree cost requirement;
    adjust the multicast tree by replacing one or more of the plurality of links in accordance with a link utilization objective; and
    re-evaluate the tree cost of the adjusted multicast tree, and re-adjust the evaluated multicast tree until the acceptable tree cost requirement is satisfied.

16. The network entity of claim 15, wherein the tree cost is a measure of tree depth or a number of links in the multicast tree.

17. The network entity of claim 15, wherein the link utilization is a ratio of bandwidth for sending the multicast traffic on the links to a total capacity for routing traffic on the links.

18. The network entity of claim 15, wherein the programming is mixed integer linear programming (MILP).

19. The network entity of claim 15, wherein the network entity is a Software Defined Networking (SDN) controller.

20. The network entity of claim 15, wherein the multiple destinations are transmit stations for wireless communications.

* * * * *